Feb. 12, 1957 N. R. HADFIELD 2,780,884
FISHING LURES
Filed April 27, 1955
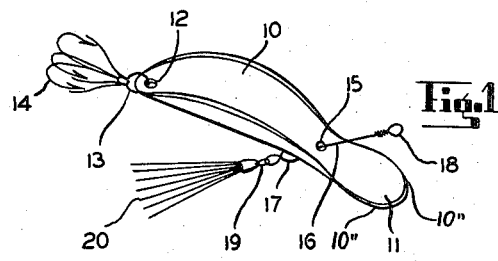
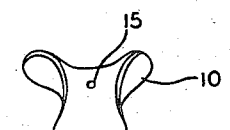
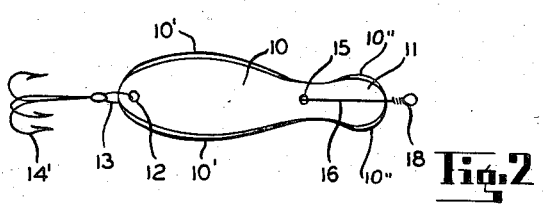
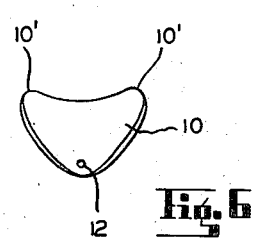
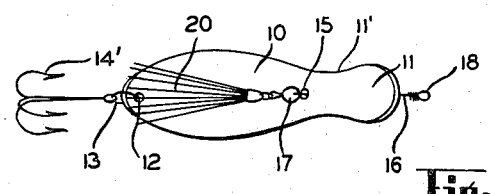
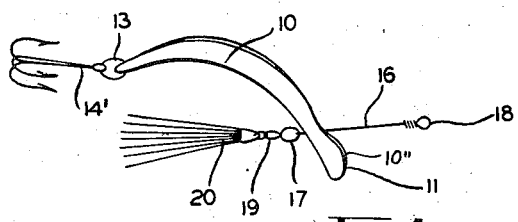
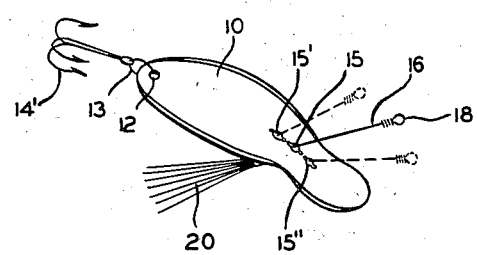
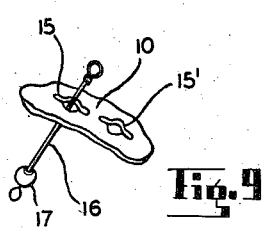
INVENTOR.
NEAL R. HADFIELD
BY
PARKER & CARTER
ATTORNEYS

United States Patent Office 2,780,884
Patented Feb. 12, 1957

2,780,884

FISHING LURES

Neal R. Hadfield, Milwaukee, Wis.

Application April 27, 1955, Serial No. 504,220

4 Claims. (Cl. 43—42.19)

My invention relates to fishing lures and more particularly to a lure constructed of a single flat sheet of material.

The object of my invention is to provide a lure that has a body formed to a shape and contour to assume a laterally wobbling action as it is being drawn through the water.

Another object of my invention is to provide a device of the character described that will follow a path of a substantially predetermined depth below the surface of the water while in use.

Still another object of my invention is to provide a lure of the character described that may have its lead adjusted to vary the depth at which the bait or lure will normally travel below the surface of the water.

A further object of my invention is to provide a lure that, with normal manipulation, will not spin due to its contour and shape.

It is manifest to anyone familiar with the use of artificial bait or lures for fishing that it is desirable and necessary that action be provided to make the lure attractive during its use. It is common practice to employ varied types of spinners or spoons rotatably mounted on an axis. These spoons and spinners are usually individually constructed to form a part of the body of the complete assembly of the lure.

The lure described, illustrated and claimed herein consists of a single body of flat material formed to a contour to provide a convex-concave blade having its forward portion angularly disposed in its relation to the body, so as to produce a laterally wobbling action when following a zigzag path below the surface of the water.

Other and further objects of my invention will become more apparent as the description proceeds when taken in conjunction with the drawings, in which:

Figure 1 is a perspective view of the entire assembled lure made in accordance with the invention, and having a treble hook of the weedless type.

Figure 2 is a top view of the lure as shown in Figure 1, except that the hook is of the open type.

Figure 3 is a bottom view of the device shown in Figure 2.

Figure 4 is a side view of the device showing the contour of the one-piece body and blade, as assembled with the line leaders, bucktail and treble hook.

Figure 5 is a direct front view of the body structure.

Figure 6 is a rear view of the body structure.

Figure 7 is a front view of the body illustrating in dotted lines the lateral wobbling motion assumed by the lure when drawn through the water.

Figure 8 is a perspective view of a modified form of lure having a plurality of slotted apertures for connecting the shaft at different points to vary the normal fishing depth of the lure, and Figure 9 shows the loop of the shaft engaging one of the slotted apertures, for adjustment of the fishing depth of the lure.

Referring now to details of the embodiment of my invention shown in the drawing, 10 indicates a body which is arched lengthwise thereof so as to be convex at the top and concave at the bottom but with upwardly arched side edges 10' so that said body, when viewed in transverse section, is concave at its top and convex at its bottom. A leading, generally straight lip 11 merges into the front end of the body 10 at a reduced neck 11'. This lip also has upturned side edges 10'' arched transversely corresponding with side edges 10' of the body portion. The entire body 10 and lip 11 are constructed of a single piece of sheet material such as metal or the like, highly polished on the surface. Said body and lip assume the general shape of a shoe horn, as seen in Figures 5, 6 and 7.

The body 10 is provided with an aperture 12 at its rearward end to accommodate a ring shown at 13 which acts as a support for a hook assembly, which may be of the treble weedless type shown at 14 in Figure 1, or may be of the open type shown at 14' in Figures 2, 3, 4 and 8. Another aperture 15 is located substantially at the neck 11 centrally of the body. This aperture 15 is adapted to receive a shaft 16 preferably of wire which extends freely therethrough and acts as a common axis to permit relatively free universal swivelling and angular movements of the body portion when the lure is in use. In Figures 8 and 9, I show a plurality of slotted apertures 15, 15' and 15'' for adjustment of the shaft lengthwise of the body.

A bead 17 is threaded on the shaft 16 and acts as a bearing disposed rearward of the aperture 15 in the body 10. Shaft 16 also has a flat loop 18 at its forward end for the attachment of the fishing line and a loop 19 at its rearward end for attachment of a bucktail or similar flexible appendage indicated at 20, which adds to the attractiveness and efficiency of the lure.

In use, the lure will tend to have a lateral wobbling or swinging action about the point of juncture of the shaft 16 with the aperture 15, but without spinning, as indicated in dotted lines in Figure 7. At the same time, the entire lure will usually tend to dart from side to side in an especially attractive manner. In the modified form shown in Figures 8 and 9, the longitudinally slotted apertures 15, 15' and 15'' permit the loop 18 of the shaft 16 to be selectively passed through one of said slots, so as to adjust the depth at which the lure will normally travel below the surface of the water.

Although I have shown and described certain embodiments of my invention, it will be understood that I do not wish to be limited to the exact construction shown and described but that various changes and modifications may be made without departing from the spirit and scope of the invention as defined by the appended claims.

I claim:

1. A fishing lure comprising an elongated body of sheet material having a main portion arched upwardly longitudinally thereof and with upwardly curved side edges, an integral lip portion of reduced width and reduced longitudinal curvature merging into the front end of said main portion at a neck portion, a trailing hook assembly connected to the rear end of said main portion, a shaft having an intermediate portion slideably passing through said body substantially centrally of said neck portion for swivelling engagement therewith, said shaft having a line-attaching eye at its front end, and a flexible appendage only connected to its rear end, said flexible appendage normally being disposed in trailing position below said arched main portion, and being shielded by said lip portion when the lure is pulled from the front end of said shaft.

2. A fishing lure comprising an elongated body of sheet material having a main portion arched upwardly longitudinally thereof and with upwardly curved side edges, an integral lip merging into the front end of said main portion at a neck portion, a trailing hook assembly connected to the rear end of said main portion, said neck portion having a centrally disposed aperture, a shaft passing freely through said aperture, said shaft having a line-attaching eye at its front end, a flexible appendage only attached to its rear end, said appendage normally being disposed in trailing position below said arched main body portion when the lure is pulled from the front end of the shaft, and the shaft also having a bead slidably mounted thereon for forming a bearing to engage the underface of the neck and permitting relatively free universal swivelling and angular movements between said body and said shaft.

3. A fishing lure comprising an elongated body of sheet material having a main portion arched upwardly longitudinally thereof and with upwardly curved side edges, an integral lip portion of reduced width and reduced longitudinal curvature merging into the front end of said main portion at a neck portion, a trailing hook assembly connected to the rear end of said main portion, said neck portion having a plurality of centrally disposed apertures aligned longitudinally therealong, a shaft having an intermediate portion adapted to be selectively engaged in one of said apertures with freedom for swivelling and angular movements relative to said neck, said shaft also having a line attaching eye at its front end and a flexible appendage only attached to its rear end, said appendage normally being disposed in trailing position below said arched main body portion when the lure is pulled from the front end of the shaft, and each of said apertures being slotted to permit the eye of said shaft to be passed therethrough for selectively engaging the shaft in one of said apertures, to adjust the lure to varying depths at which it normally travels.

4. The structure of claim 3, wherein the eye at the front end of the shaft is relatively flat, and the apertures for receiving the shaft are slotted to permit the eye of the shaft to be passed therethrough for attaching or detaching the shaft relative to the body.

References Cited in the file of this patent

UNITED STATES PATENTS

| | | |
|---|---|---|
| 1,644,151 | Rodgers | Oct. 4, 1927 |
| 1,861,905 | Bergstedt | June 7, 1932 |
| 1,890,400 | Miller | Dec. 6, 1932 |
| 2,402,853 | Sweeney | June 25, 1946 |
| 2,484,747 | Russell | Oct. 11, 1949 |
| 2,562,743 | Schindler | July 31, 1951 |
| 2,618,096 | Wagner | Nov. 18, 1952 |
| 2,698,494 | Larsen | Jan. 4, 1955 |

FOREIGN PATENTS

| | | |
|---|---|---|
| 59,407 | France | Jan. 6, 1954 |